(12) United States Patent
St-Pierre

(10) Patent No.: US 6,746,090 B2
(45) Date of Patent: Jun. 8, 2004

(54) TRACK WITH CLIPS IN A NON-SEQUENTIAL ARRANGEMENT

(75) Inventor: Yves St-Pierre, Wickham (CA)

(73) Assignee: Soucy International Inc., Drummondville (CA)

( * ) Notice: Subject to any disclaimer, the term of this patent is extended or adjusted under 35 U.S.C. 154(b) by 46 days.

(21) Appl. No.: 10/042,748

(22) Filed: Jan. 22, 2002

(65) Prior Publication Data

US 2003/0122424 A1 Jul. 3, 2003

(30) Foreign Application Priority Data

Jan. 25, 2001 (CA) .............................................. 2332224

(51) Int. Cl.[7] ...................... B62D 55/24; B62D 55/275; F16G 1/04
(52) U.S. Cl. ........................ 305/168; 305/167; 305/178
(58) Field of Search ........................ 305/165, 167–168, 305/171, 173–179

(56) References Cited

U.S. PATENT DOCUMENTS

| | | | | |
|---|---|---|---|---|
| 4,474,414 A | * | 10/1984 | Tokue | 305/168 |
| 5,709,440 A | * | 1/1998 | Lecours | 305/178 |
| 5,730,510 A | * | 3/1998 | Courtemanche | 305/168 |
| D408,326 S | * | 4/1999 | Dandurand | 305/185 |
| 6,109,705 A | * | 8/2000 | Courtemanche | 305/178 |
| D436,892 S | * | 1/2001 | Soucy et al. | 305/165 |
| 6,505,896 B1 | * | 1/2003 | Boivin et al. | 305/178 |
| 6,510,913 B1 | * | 1/2003 | Morin et al. | 180/182 |

* cited by examiner

Primary Examiner—Russell D. Stormer
Assistant Examiner—Jason R. Bellinger
(74) Attorney, Agent, or Firm—Robert Brouillette; Ronald S. Kosie; Gaëtan Prince

(57) ABSTRACT

The endless track is made of a reinforced rubber material with longitudinally spaced and transversely disposed stiffeners embedded in the rubber material. The body defines a central band portion and opposite lateral band portions that are located on the sides of the central band portion. The central band portion is delimited from the two lateral band portions by two corresponding suspension bearing portions, each defining a plurality of clipping sites that are adapted to receive a metallic clip. The track is characterized in that the clips that are mounted in an arrangement of mixed clip sequences on each suspension bearing portion. Each [[c lip]] clip sequence comprises one or more successive clipping sites with clips immediately followed by one or two successive clipping sites without a clip. This arrangement of mixed clip sequences lowers the overall noise level generated by the track while rotating. It also lowers the overall weight of the track and the manufacturing costs thereof.

13 Claims, 2 Drawing Sheets

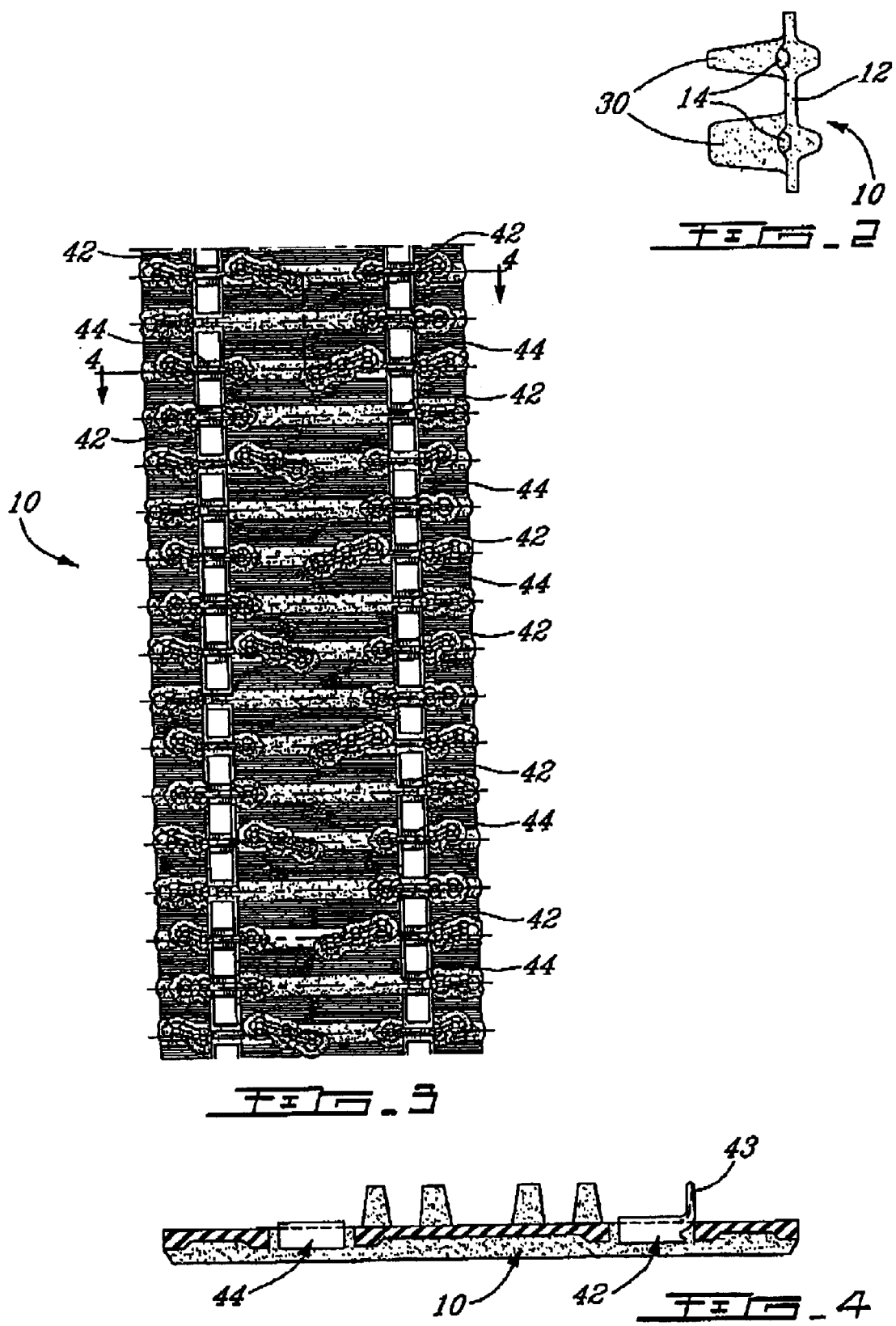

though not excluding any other applications, tracks for
TRACK WITH CLIPS IN A NON-SEQUENTIAL ARRANGEMENT The present invention relates to an endless track for a vehicle. More particularly, the present invention relates to a track which is particularly well suited for a snowmobile.

A rubber-band track is found on off-road motor driven vehicles which are designed to travel on grounds that could not adequately support wheels or on which traction forces could not be suitably applied with the use of wheels. A rubber-band track consists essentially of an endless band of a reinforced material that is longitudinally flexible so as to follow the curvature around drive and idler sprocket wheels. Each track is designed to support a portion of the weight of the vehicle and apply a traction force on the ground.

Without excluding any other applications, tracks for vehicles traveling at moderate or high speeds, which are essentially snowmobiles, are the prime interest of the present invention. The snowmobiles are then used in the present description as the main application for the tracks and the method in accordance with the present invention.

A snowmobile is equipped with a rubber-band track that features an endless body made of a reinforced rubber material with longitudinally spaced and transversely disposed stiffeners embedded in the rubber material between the sides of the track. The body defines a central band portion and opposite lateral band portions that are located on the sides of the central band portion. The opposite lateral band portions are separated from the central band portion by a corresponding row of holes. Each row of holes generally cooperates with the teeth of a corresponding pair of drive and idler sprocket wheels. The track is positioned under the chassis of the snowmobile and supports most of the weight. A pair of front ski-like runners are provided to steer the snowmobile and support the other portion of the weight.

The body of the track has a ground-engaging outer side and an inner side. The inner side cooperates with a suspension system. The weight of the track by either a pair of slide rails or a plurality of bogey wheels that are mechanically connected to the other parts of the suspension system. Alternatively, the drive and idler sprocket wheels may engage driving lugs that are inwardly projecting from the inner side of the track. The suspension system is also used to support the track with respect to lateral movements.

Suspension systems using slide rails are the now used on almost every new models of snowmobiles. While some bogey wheels are present at strategic locations, all the weight from the suspension system is transmitted to the track by the pair of slide rails. The slide rails cooperate with the inner side of the track, more particularly with the portion of the track that engages the ground. Each slide rail typically comprises an expandable low friction runner that engages the inner side of the track and that is replaced whenever it is worn to a given extent. Now, to further lower the friction coefficient between the inner side of the track and the bottom face of the runners, the track is equipped with a plurality of metallic clips. The clips are conveniently aligned with the row of holes and crimped over the material on the inner side between two successive holes. This material is, in most cases, surrounds a corresponding stiffener passing between the central band portion and the lateral band portions. Conventional clips are also used for laterally guiding the track. To do so, all or a large number of the clips are provided with a side flange that is configured and disposed to slide on the side of a respective runner.

Formerly, clips were generally provided at every available space, which are referred to as the clipping sites. There are usually from 24 to 80 clipping sites on each side of the track. Few models have clips that are omitted at regular intervals. In all cases, the clips come in contact at regular intervals with the runners when the track rotates. This repetitive contact generates a noise which varies in function of the rotation speed of the track. The noise often becomes annoying and unpleasant, especially when traveling over long distances.

SUMMARY

One aspect of the present invention is to lower the noise level generated by the snowmobile track while rotating by mixing clip sequences on each row of clipping sites so as to lower the overall noise level generated by the track while rotating. Each clip sequence comprises one or more successive clips and one or two successive clipping sites without clip.

Another aspect of the present invention is to lower the weight and manufacturing costs of the track by omitting some clips at various clipping sites.

These and other aspects and advantages of the present invention are described in or apparent from the following detailed description of a preferred embodiment made in conjunction which the apparent figures.

BRIEF DESCRIPTION OF THE FIGURES

FIG. 2 is a transversal side view taken from line [[II—II]] 2—2 in FIG. 1.

FIG. 3 is a detailed view taken from enclosure 3 taken from FIG. 1.

FIG. 4 is a transversal cross-sectional view taken from line 4—4 in FIG. 3.

DETAILED DESCRIPTION

Figure 1:
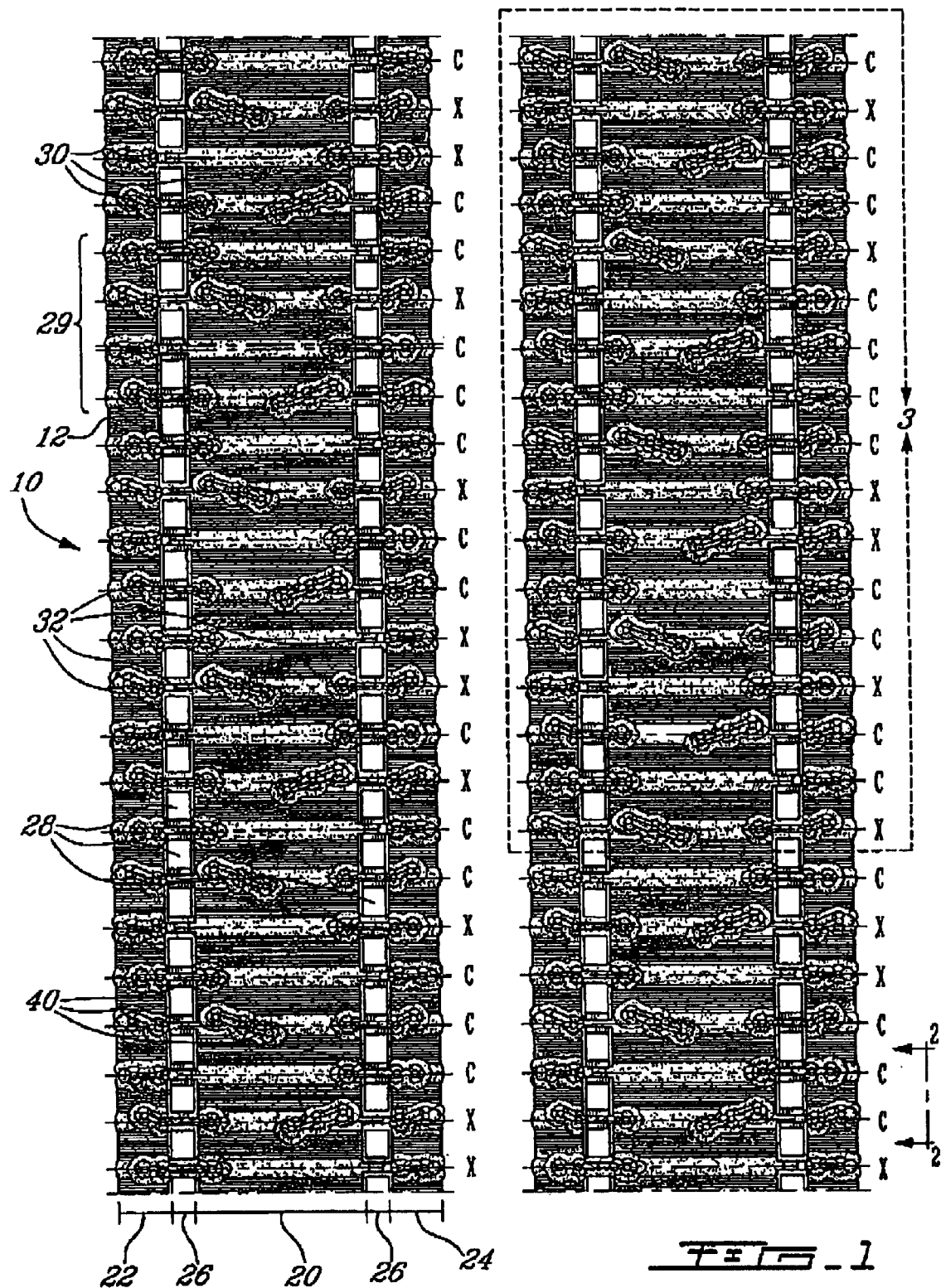
FIG. 1 is a plan view of an example of a track according to a preferred embodiment of the present invention.

A track (10) according to a possible and preferred embodiment of the present invention is described hereinafter and illustrated in the appended figures.

As shown in FIGS. 1 and 2, the track comprises an endless body (12) made of B reinforced rubber material with longitudinally spaced and transversely disposed stiffeners (14) embedded in the rubber material. The body defines a central band portion (20) and opposite lateral band portions (22,24) that are located on the sides of the central band portion (20). Between each lateral band portion (22) and the central band portion (20) is located a suspension bearing portion (26) which comprises a plurality of holes (28). Each hole (28) is located between two successive stiffeners.

The body (12) of the track (10) has a ground-engaging outer side that is provided with a tread pattern ([[28]] 29). The tread pattern ([[28]] 29) is repeated uniformly over the entire length of the track (10). The tread pattern ([[28]] 29) comprises a plurality of projecting traction lugs (30) disposed on the central band portion (20), on the lateral band portions (22,24) or both. The traction lugs (30) have typically between ¾ and 3 inches. The width of the central band portion (20) is typically in the range of 5 to 10 inches, with a preferred value of 6½ inches when the total width of the track (10) is 15 inches.

The proximal edges of two successive holes (28) of a same suspension bearing portion (26) and the inner side of the track (20) underneath the corresponding stiffener between the two successive holes (28) define a clipping site (32). The track (10) comprises a plurality of clips (40) that are mounted in an arrangement of mixed clip sequences. Each clip sequence comprises one or more successive clips (40) immediately followed by one or two successive clipping sites without a clip (40). In use, because of the mixed clip sequences, the overall noise level generated by the track (10) is lowered since the same clipping sequence does not pass under the runners at every increment in the rotation of the track (10). Omitting clips also have the advantage of reducing die total weight of the track (10) and the manufacturing costs thereof.

Preferably, each clip sequence comprises between one and eight successive clips (40) immediately followed by one or two successive clipping sites without a clip (40). More preferably, there is provided between one and six successive clips immediately followed by one or two successive clipping sites without a clip (40). A small number of successive clips (40) is preferred since it provides more varied sequences over the entire track (10). Another factor is that a small number of successive clips (40) has a great visual impact to the potential buyers of the tracks (10), which might otherwise think that a track (10) is defective since some clips are missing at few locations.

Mixing clip sequences means that the same clip sequences does not repeat on a same row. For instance,there should be no double repetitions, such as:

C-C-C-C-X-C-C-X-C-C-C-C-X-C-C-X where C represents a clip and X represents a site without a clip.

The two rows of clipping sites may be either identical, offset or, preferably, provided with completely different clip sequences.

There are two main kinds of clips (40). As shown in FIG. 4, the first is the L-shaped clip (42) which comprises a side flange (43) that slide against the side of the runners. The other is the flat clip( which is essentially similar to the L-shaped clip (42) but does not comprise a flange. A track (10) according to the present invention and illustrated in FIG. 3 preferably comprises flat clips (44) in addition to the standard L-shaped clips (42). However, when using flat clips (44), one L-shaped clip (42) should be at least provided at any four successive clipping sites with or without clips. This ensures a proper guidance to the track (10) so that the track (10) does not become misaligned with the runners, thereby causing an intense friction. Using a mix of flat clips (44) and L-shaped clips (42), in addition to the clipping sites without a clip, provide an improve variation of the clipping pattern.

The present invention also provides a method of mounting clips (40) on a track (10). The method is characterized in that it comprises the steps of determining an arrangement of mixed clip sequences for each row of clipping sites so as to lower the overall noise level generated by the track (10) while rotating. Each clip sequence comprises one or more successive clips and one or two successive clipping sites without a clip. Thereafter, the clips are mounted at designated clipping sites.

Although preferred embodiments of the invention have been described in detail herein and illustrated in the accompanying figures, it is to be understood that the invention is not limited to these precise embodiments and that various changes and modifications may be effected therein without departing from the scope or spirit of the present invention.

What is claimed is:

1. An endless track for a vehicle, the track having an endless body made of a reinforced rubber material with longitudinally spaced and transversely disposed stiffeners embedded in the rubber material, the body defining a central band portion and opposite lateral band portions that are located on each side of the central band portion, the central band portion being delimited from the two lateral band portions by two corresponding suspension bearing portions, each defining a plurality of clipping sites separated from each other by holes through said body, said clipping sites being adapted to receive a metallic clip, said track further comprising:

clips which are mounted on more than one of said clipping sites and in an arrangement which defines a clip sequence, each clip sequence being comprising one or more successive clipping sites with a clip mounted thereon immediately followed by one or two successive clipping sites without a clip, wherein each consecutive clip sequence along said suspension bearing portions is different from each of its immediate neighbors.

2. An endless track according to claim 1, wherein each clip sequence comprises between one and eight successive clipping sites with clips immediately followed by one or two successive clipping sites without a clip.

3. An endless track according to claim 1, wherein each clip sequence comprises between one and six successive clipping sites with clips immediately followed by one or two successive clipping sites without a clip.

4. An endless track according to claim 1, wherein the clips comprise L-shaped clips and flat clips, one L-shaped clip being at least provided at any four successive clipping sites with or without clips.

5. An arrangement of clips for a track having a plurality of clipping sites disposed in two parallel rows, the arrangement comprising mixed clip sequences on each row of clipping sites so as to lower the overall noise level generated by the track while rotating, each clip sequence comprising one or more successive clipping sites with clips and one or two successive clipping sites without a clip.

6. An arrangement according to claim 5, wherein each clip sequence comprises between one and eight successive clipping sites with clips immediately followed by one or two successive clipping sites without a clip.

7. An arrangement according to claim 5, wherein each clip sequence comprises between one and six successive clipping sites with clips immediately followed by one or two successive clipping sites without a clip.

8. An arrangement according to claim 5, wherein the arrangement comprises L-shaped clips and flat clips, one L-shaped clip being at least provided at any four successive clipping sites with or without clips.

9. A method of mounting clips on a track having a plurality of clipping sites disposed in two parallel rows, the method comprising the steps of:

determining an arrangement of mixed clip sequences for each row of clipping sites so as to lower the overall noise level generated by the track while rotating, each successive clip sequence comprising one or more successive clips and one or two successive clipping sites without a clip being different from each of its immediate neighbors; and mounting the clips at designated clipping sites.

10. A method according to claim 9, wherein each clip sequence comprises between one and eight successive clipping sites with clips immediately followed by one or two successive clipping sites without a clip.

11. A method according to claim 9, wherein each clip sequence comprises between one and six successive clipping sites with clips immediately followed by one or two successive clipping sites without a clip.

12. A method according to claim 9, wherein the arrangement comprises L-shaped clips and flat clips, one L-shaped clip being at least provided at any four successive clipping sites with or without clips.

13. A track manufactured in accordance of the method as set fourth in claim 9.

* * * * *